(12) United States Patent
Mouri (10) Patent No.: US 8,280,262 B2
(45) Date of Patent: Oct. 2, 2012

(54) LIGHT RECEIVING CIRCUIT AND PHOTOCOUPLER ISOLATION CIRCUIT

(75) Inventor: Yuuki Mouri, Yokohama (JP)

(73) Assignee: Renesas Electronics Corporation, Kanagawa (JP)

( * ) Notice: Subject to any disclaimer, the term of this patent is extended or adjusted under 35 U.S.C. 154(b) by 255 days.

(21) Appl. No.: 12/759,261

(22) Filed: Apr. 13, 2010

(65) Prior Publication Data

US 2010/0266292 A1    Oct. 21, 2010

(30) Foreign Application Priority Data

Apr. 15, 2009   (JP) .................. 2009-098873

(51) Int. Cl.
*H04B 10/06* (2006.01)
(52) U.S. Cl. ......... 398/202; 398/203; 398/208; 398/209
(58) Field of Classification Search .................. 398/202, 398/203, 208, 209
See application file for complete search history.

(56) References Cited

U.S. PATENT DOCUMENTS

| | | | |
|---|---|---|---|
| 6,208,446 B1 * | 3/2001 | Faifman | 398/136 |
| 8,116,055 B2 * | 2/2012 | Baumgartner et al. | 361/93.9 |
| 2010/0014568 A1 * | 1/2010 | Strzalkowski | 375/220 |

FOREIGN PATENT DOCUMENTS

| | | |
|---|---|---|
| JP | 11-234098 A | 8/1999 |
| JP | 2003-152649 A | 5/2003 |

* cited by examiner

*Primary Examiner* — Dalzid Singh
(74) *Attorney, Agent, or Firm* — Sughrue Mion, PLLC (57) ABSTRACT

A light receiving circuit includes: a light receiving element that receives an optical signal and converts into an electrical signal; a comparator that demodulates the information on the optical signal to a pulsed signal; a band limit circuit disposed between the light receiving element and the comparator, the band limit circuit removing noise components of frequency higher than the pulsed signal; and a comparator threshold circuit disposed between the light receiving element and the comparator, the comparator threshold circuit generating a threshold of the comparator and limiting the threshold of the comparator within a binary range.

8 Claims, 9 Drawing Sheets

PRIOR ART

LIGHT RECEIVING CIRCUIT AND PHOTOCOUPLER ISOLATION CIRCUIT

INCORPORATION BY REFERENCE

This application is based upon and claims the benefit of priority from Japanese patent application No. 2009-098873, filed on Apr. 15, 2009, the disclosure of which is incorporated herein in its entirety by reference.

BACKGROUND

1. Field of the Invention

The present invention relates to a light receiving circuit, and a photocoupler isolation circuit in which the input portion and the output portion of the circuit require electrical isolation.

2. Description of Related Art

As a method to remove noise components, a method to eliminate components other than signal components by a low-pass filter or a high-pass filter is known widely. However, when a pulsed signal is reproduced by this method, the reproduced signal becomes the sum of odd-number order harmonics of the sinewave component. Therefore, it is necessary to secure frequency bands of 5 times or higher. Thus, when the low-pass filter or the high-pass filter is used, it is necessary to configure so that the pulsed signal can pass through the filter. As a result, many noise components also pass through the low-pass filter or the high-pass filter.

Figure 8:
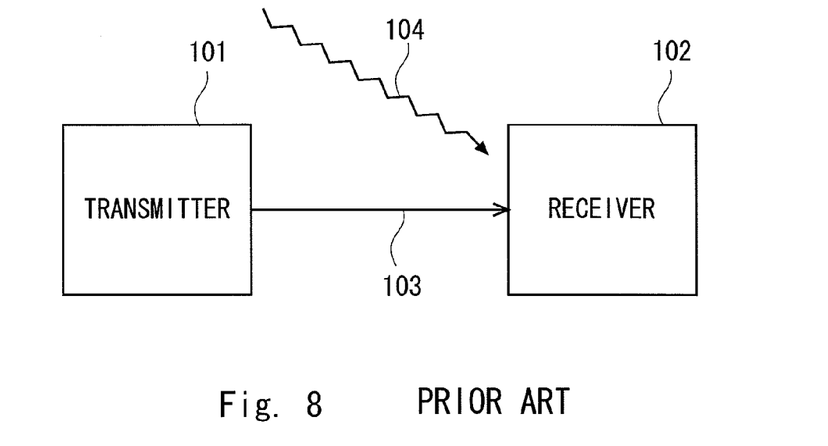
FIG. 8 is a system structure chart of the infrared data communications equipment disclosed in Japanese Unexamined Patent Application Publication No. 11-234098.

In optical communication devices such as infrared data receiving devices, a relatively low frequency signal (40 kHz) is transmitted to a receiver 102 from a transmitter 101 as an optical signal 103 (see FIG. 8). It is necessary to remove the influence of external disturbing light 104 such as sunlight or illumination light (several kHz or lower) that is a signal having a frequency lower than the frequency of the optical signal 103. Therefore, a differentiating circuit is used to perform the rising edge detection and the removal of noise having frequency components sufficiently lower than the signal frequency. Here, the signal components of high frequency are attenuated when the above-mentioned low-pass filter is used to remove the noise components contained in the pulsed signal. As a result, there are problems that the rising edge gets blunted and the edge detection is impossible.

Figure 9:
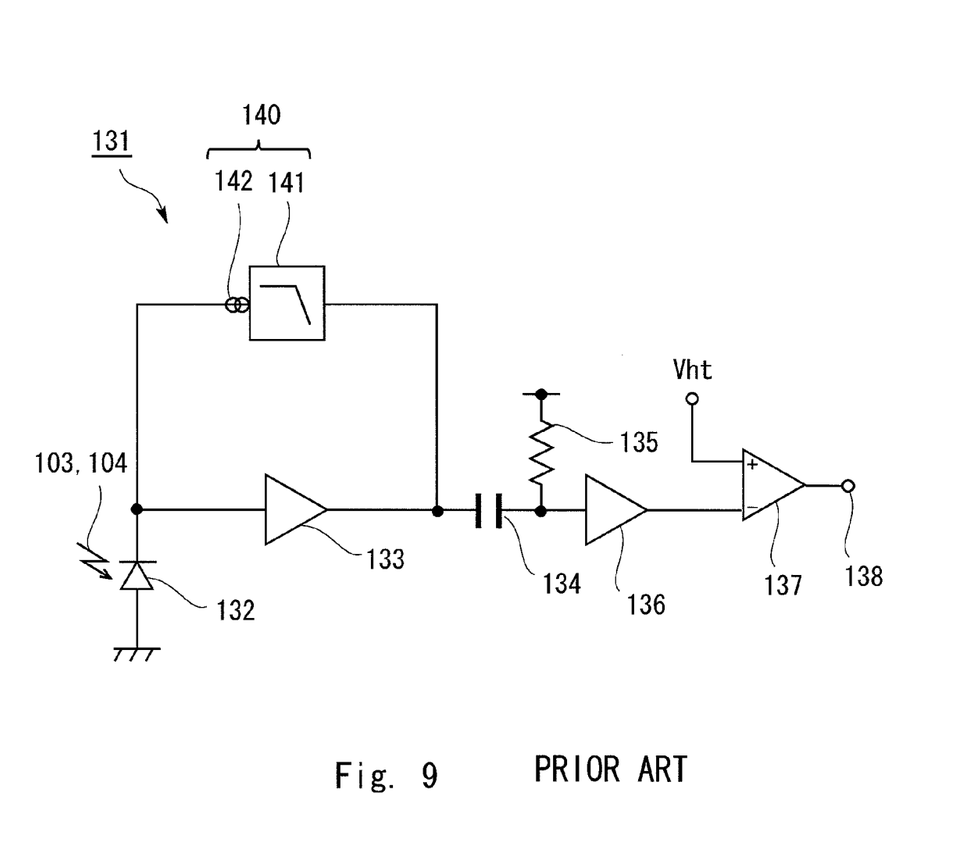
FIG. 9 is a pulsed signal demodulation circuit disclosed in Japanese Unexamined Patent Application Publication No. 11-234098.

FIG. 9 shows a block diagram of a receiving circuit device (a pulsed signal demodulation circuit) in the infrared data communications device disclosed in Japanese Unexamined Patent Application Publication No. 11-234098. A photoelectric conversion is performed on an optical signal 103 output from a transmitter 101 (see FIG. 8) and disturbing light 104 by a photodiode 132. The electric current corresponding to the input light level is output to an amplifier 133 from the photo diode 132. By the amplifier 133, the current output from the photodiode 132 is converted into the voltage and the resultant voltage is amplified. An output of the amplifier 133 is input to an amplifier 136 through a coupling capacitor 134 and a pull-up resistor 135.

An output of the amplifier 136 is input to a comparator 137. In the comparator 137, the output of the amplifier 136 is discriminated according to its level by a detection voltage Vth that is defined in advance according to the voltage of a pull-up resistor 135. Then, a square wave pulse, which is the result of the discrimination, is output from a comparator output 138. From the output of the amplifier 133, low frequency components corresponding to the disturbing light 104 are extracted by an auto-bias control circuit (ABCC) 140, and the electric current corresponding to the low frequency components is returned to the input side of the amplifier 133. The auto-bias control circuit 140 includes a primary low-pass filter 141 to extract low frequency signal components corresponding to the disturbing light 104 from the output of the amplifier 133. Moreover, the auto-bias control circuit 140 includes a current-source 142 to convert the output of the low-pass filter 141 from the voltage signal into a current signal and return the resultant current to the input side of amplifier 133.

By employing the above-mentioned constitution, the amplifier 133 amplifies an input pulse signal electric current. Moreover, the electric current corresponding to disturbing light noise components is adjusted by the auto-bias control circuit 140. The electric current output from the auto-bias control circuit 140 returns in the input side of amplifier 133. As a result, the noise components of the disturbing light of the output of the amplifier 133 are removed.

The signal is differentiated once between the input and output of the amplifier 133 by the auto-bias control circuit 140. As for the demodulated pulsed signal, the generation of non-desired vibration is suppressed and the generation of the malfunction pulse is reduced.

Figure 10A:
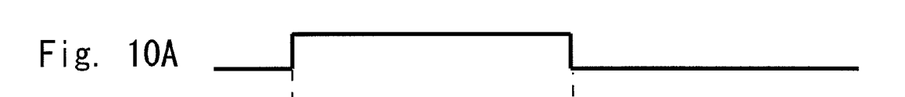
FIG. 10A is an output wave form chart of the pulsed signal demodulator circuit disclosed in Japanese Unexamined Patent Application Publication No. 11-234098.
Figure 10B:
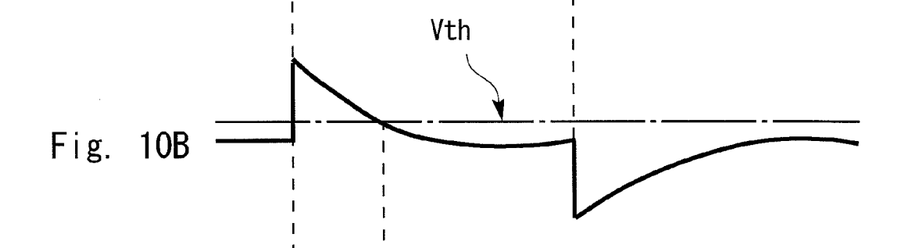
FIG. 10B is an output wave form chart of the pulsed signal demodulator circuit disclosed in Japanese Unexamined Patent Application Publication No. 11-234098.
Figure 10C:
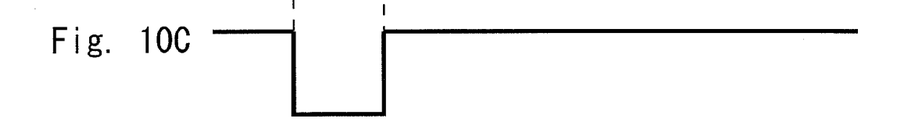
FIG. 10C is an output wave form chart of the pulsed signal demodulator circuit disclosed in Japanese Unexamined Patent Application Publication No. 11-234098.

For example, a wave pattern output from the amplifier 136 does not have the undesired vibration as shown in FIG. 10B even if incident radiation is influenced by the disturbing light 104 greatly as shown in FIG. 10A. Therefore, as shown in FIG. 10C, the output pulses from the comparator 137 to the comparator output 138 do not produce a malfunction pulse.

Japanese Unexamined Patent Application Publication No. 2003-152649 proposes the following configuration that suppresses continuous wave noise or impulse noise input as disturbing light noise. When an input signal is contained in a signal output from an amplification means, the gain of the amplification means is controlled so that the input signal can have a prescribed signal level. In addition, when noise components are contained in a signal output from the amplification means, the gain of the amplification means is controlled so that the noise component can have a prescribed noise level.

By the way, an isolation circuit, e.g., insulation type amplifier (hereinafter referred to as "isolation amplifier") has been used to exclude a big common mode noise or to secure safety recently at various places such as factories, plants, and hospitals that use the medical appliances. Particularly big common mode noise often generates power supply difference of 1,000V or larger between high-current electronic devices and high-sensitivity electronic devices in places such as factories or plants and so on. An isolation amplifier using a photocoupler transmits a signal optically and is thereby completely insulated electrically. Therefore, in terms of the noise tolerance, it is superior to an isolation amplifier using magnetism. Recently to enable more precise control for an inverter or an AC servo used in factories or plants, the isolation amplifier is placed, for example, between a motor and a precision instrument such as the microcomputer.

SUMMARY

In order to perform highly precise analog communication, the isolation amplifier needs a technique capable of coping with an optical signal with which information is transmitted by pulse-width modulation at a high operating frequency (hereinafter referred to as "the high-speed digital modulation").

However, in Japanese Unexamined Patent Application Publication No. 11-234098, the reproduction of a pulse width required by high-speed digital modulation is impossible due to the noise contained in the optical signal 103, and there is the problem that the optical signal 103 cannot be received normally. The receiver disclosed in Japanese Unexamined Patent Application Publication NO. 11-234098 spatially transmits the optical signal 103 having relatively low frequency (40 kHz) from the transmitter 101 to the receiver 102. Therefore, it is necessary to remove the influence of external disturbing light 104 such as sunlight or illumination light (several kHz or lower) that is a signal having a frequency lower than the frequency of the optical signal 103. It is also necessary to perform the rising edge detection of the pulsed signal. Thus, differentiating circuit consisting of pull-up resistor 135 and coupling capacitor 134 is used. The noise of disturbing light 104 having sufficiently low frequency components is removed by the differentiating circuit, but noise components other than that contained in the optical signal 103 constantly pass and are amplified by the amplifier. As a result, noise components exceeding the threshold Vth of the comparator output 138 are detected.

By passing the differentiating circuit, the pulsed signal becomes the differential waveform from pulse waveform. Output pulse width is determined by the pulse signal and the threshold Vth of the comparator. Therefore, as shown in FIG. 10C, the output pulse width is always different from the pulse width (see FIG. 10A) of the input signal. For this reason, the receiving circuit cannot act normally.

It is difficult to apply the technique of Japanese Unexamined Patent Application Publication No. 2003-152,649 to high-speed digital modulation to convey information by using a pulse width. This is because the information carried by using the pulse width of the pulsed signal is lost by going through a signal wave detector and integrator.

A first exemplary aspect of the present invention is a light receiving circuit including: a light receiving element that receives an optical signal and converts into an electrical signal; a comparator that demodulates the information on the optical signal to a pulsed signal; a band limit circuit disposed between the light receiving element and the comparator, the band limit circuit removing noise components of frequency higher than the pulsed signal; and a comparator threshold circuit disposed between the light receiving element and the comparator, the comparator threshold circuit generating a threshold of the comparator and limiting the threshold of the comparator within a binary range.

The light receiving circuit according to the first exemplary aspect of the present invention includes the band limit circuit that removes noise components of frequency higher than the pulsed signal, and the comparator threshold circuit that generates a threshold of the comparator and limits the threshold of the comparator in the binary range, without disposing the differentiating circuit and integration circuit. Thus, the malfunction of the light receiving circuit caused by the noise can be reduced, and it is possible for the light receiving circuit to reproduce the pulse width necessary for the pulse-width modulation. For this reason, there is achieved an advantageous effect that the light receiving circuit can receive normally.

A second exemplary aspect of the present invention is a photocoupler isolation circuit including: an input side chip including a light emitting element that converts a pulse width modulated signal into an optical pulse signal and transmits the converted optical signal; and a receiving chip including a light receiving circuit that receives the optical pulse signal, wherein the light emitting element includes the above-mentioned light emitting element.

According to the present invention, there is achieved an advantageous effect that the light receiving circuit can reduce the malfunction caused by the noise, and can reproduce the pulse width. Furthermore, the photocoupler isolation circuit in which the above-mentioned light receiving circuit is mounted on can be provided.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Exemplary embodiments of the present invention will be described below. Note that other embodiments may also fall within the scope of the present invention, as long as they meet the purpose of the present invention.

Figure 1:
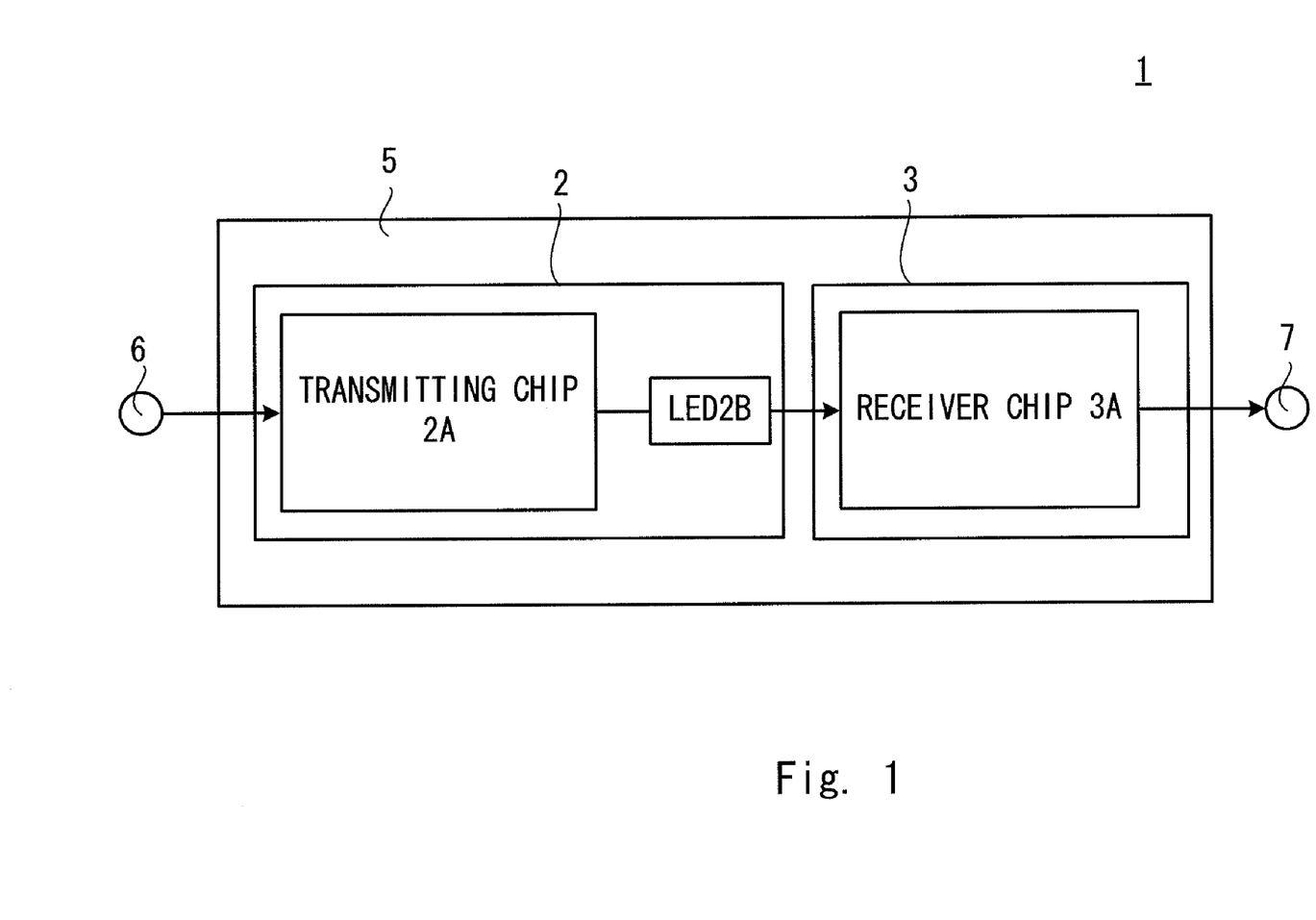
FIG. 1 is a system structure chart of the photocoupler isolation circuit according to a first exemplary embodiment of the present invention.

FIG. 1 is a system structure chart of the photocoupler isolation circuit according to a first exemplary embodiment of the present invention. Photocoupler isolation circuit 1 is formed as an IC (Integrated Circuit) including a transmitting chip 2A serving as an input side chip 2, a LED (light emitting diode) 2B, and a receiver chip 3A serving as a receiving chip 3. These components are integrally formed in the IC (an integrated circuit) and housed in one package 5. The transmitting chip 2A is connected to an input signal terminal 6, and the receiver chip 3A is connected to an output signal terminal 7. The input signal terminal 6 and the output signal terminal 7 is insulated electrically from each other. The signal input from the input signal terminal 6 is transferred from the transmitting chip 2A to the receiver chip 3A through the LED 2B.

Figure 2:
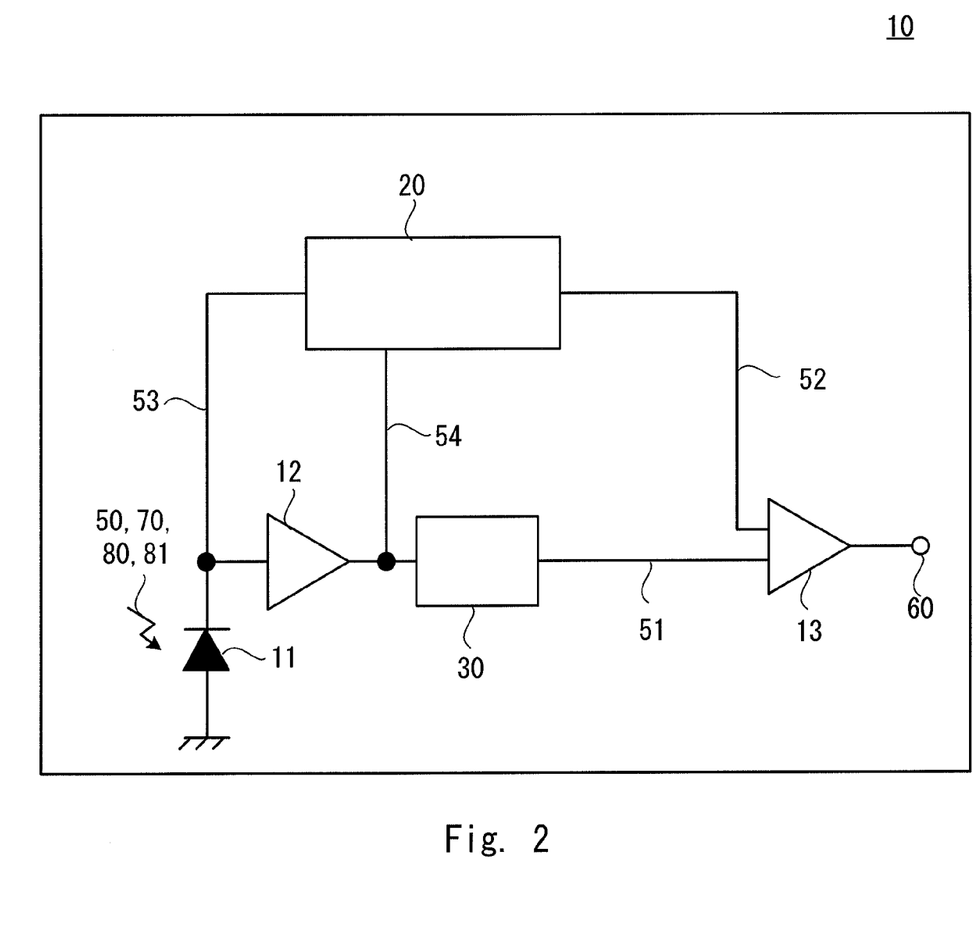
FIG. 2 is a block diagram of the receiver in the photocoupler isolation circuit according to the first exemplary embodiment of the present invention.

The receiver chip 3A includes a light receiving circuit to amplify an optical signal to the level at which signal processing is possible. FIG. 2 is a block diagram of light receiving circuit 10 according to the first exemplary embodiment of the present invention. The light receiving circuit 10 includes a photodiode 11 which is light receiving element, a current-voltage converter circuit 12, a comparator 13, a comparator threshold circuit 20, a band limit circuit 30 as shown in FIG. 2.

The photodiode 11 acts to convert the optical signal 50 into electrical signal. The photodiode 11 outputs the electric current corresponding to the input light level to the current-voltage converter circuit 12 and the comparator threshold circuit 20.

The current-voltage converter circuit 12 converts the electrical signal from the photodiode 11 into a voltage signal and amplifies the voltage signal. The output from the current-voltage converter circuit 12 is input to the band limit circuit 30 and the comparator threshold circuit 20.

The band limit circuit 30 acts to remove the noise components which are higher than the frequency of the pulsed signal of voltage signals output from the current-voltage converter circuit 12. The current-voltage converter circuit 12 generates comparator input potential 51 through the band limit circuit 30. The generated comparator input potential 51 is input to the comparator 13.

In addition to the comparator input voltage 51, the comparator threshold voltage 52 is also input to the comparator 13. The level of the comparator input voltage 51 is discriminated according to its level by the comparator threshold voltage 52. A pulsed signal of the square wave, which is the result of the discrimination, is reproduced and output from a comparator output 60. The comparator threshold voltage 52 is generated from a photodiode cathode voltage 53 and a current-voltage converter circuit output voltage 54 through the comparator threshold circuit 20.

Figure 3:
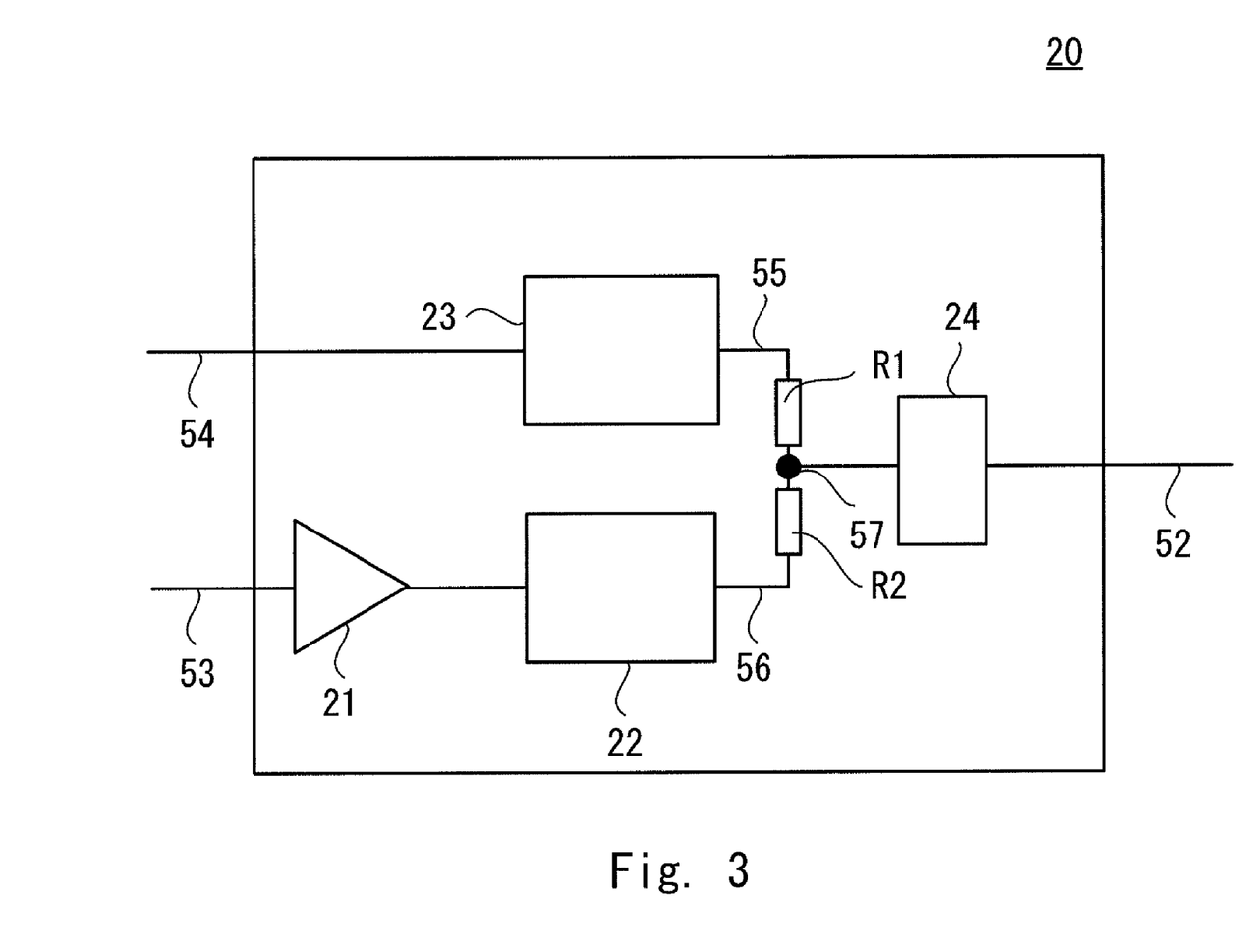
FIG. 3 is a block diagram of the comparator threshold circuit according to the first exemplary embodiment of the present invention.

FIG. 3 is a block diagram of comparator threshold circuit 20 according to the first exemplary embodiment of the present invention. The comparator threshold circuit 20 includes a buffer amplifier 21 which is amplification means, a low-pass filter 22, a peak detection circuit 23, and a clamp circuit 24.

As shown in FIG. 3, the photodiode cathode voltage 53 is input to the comparator threshold circuit 20. The photodiode cathode voltage 53 is amplified by the buffer amplifier 21 and input to the low-pass filter 22. The low-pass filter 22 removes the noise components which are higher in frequency than a pulsed signal. The low-pass filter 22 gives only a peak detection reference voltage 56 to a resistor R2.

Furthermore, the current-voltage converter circuit output voltage 54 which is the voltage sent out from the current-voltage converter circuit 12 is input to the comparator threshold circuit 20.

The current-voltage converter circuit output voltage 54 is input to the peak detection circuit 23 performing peak detection. The peak detection circuit 23 provides peak detection circuit output voltage 55 to a resistor R1.

One end of the resistor R1 and one end of the resistor R2 are connected together. At the common point, an intermediate voltage 57 is generated based on the following formula (1).

[Formula 1]

$$\text{(peak detection circuit output voltage 55} - \text{peak detection reference voltage 56)} \Big/ \left(\frac{R2}{R1+R2}\right)$$

A formula (1)

The intermediate voltage 57 is input to the clamp circuit 24. The clamp circuit 24 is used to limit the range of the threshold of the comparator threshold voltage 52 for the noise components which cannot be removed in the band limit circuit 30. By using the clamp circuit 24, the comparator threshold voltage 52 satisfies the relations of the following formula (2).

[Formula 2]

Clamp circuit lower limit voltage α<Comparator threshold voltage 52<Clamp circuit upper limit voltage β

A formula (2)

The comparator threshold voltage 52 output from the clamp circuit 24 is input to comparator 13. By inputting the output of the above-mentioned comparator threshold circuit 20 to the comparator 13, the photocoupler isolation circuit 1 can implement stable movement regardless of the change of the optical signal 50. The photocoupler isolation circuit 1 can reproduce the pulse width that is equivalent to change of the optical signal 50.

Figure 4:
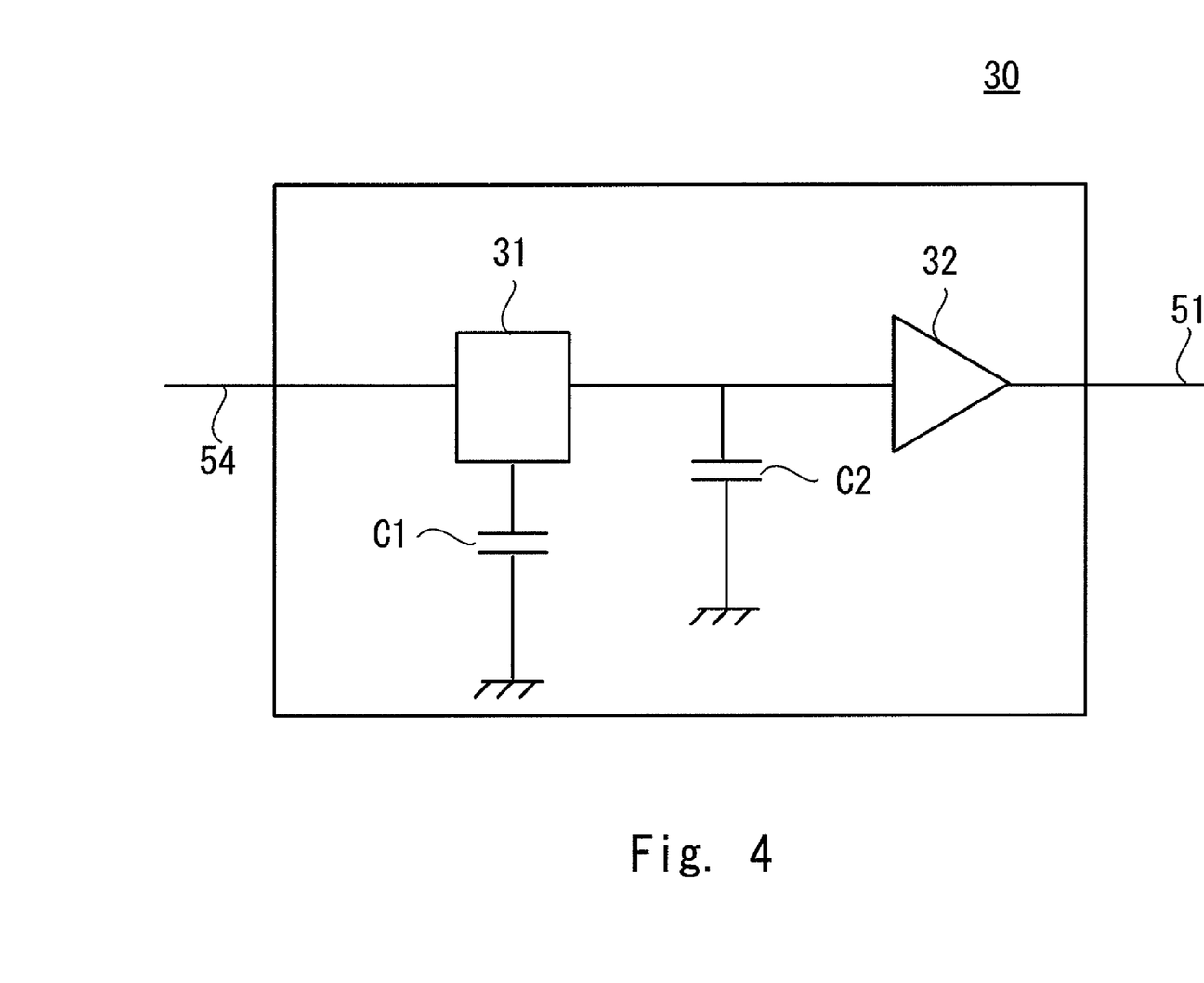
FIG. 4 is a block diagram of the band limit circuit according to the first exemplary embodiment of the present invention.

FIG. 4 is a block diagram of band limit circuit 30 according to the first exemplary embodiment of the present invention. The band limit circuit 30 includes a switching circuit 31, a buffer amplifier 32 serving as amplification means, a first capacity C1, and a second capacity C2. The switching circuit 31 is a circuit working in any clock frequency. The current-voltage converter circuit output voltage 54 output from the current-voltage converter circuit 12 is input into the switching circuit 31.

During a sampling period, the switching circuit 31 is connected to the first capacity C1, and an electric charge of the current-voltage converter circuit output voltage 54 is integrated over the period. As a result, the noise components of the switching circuit 31 are also integrated, and the noise component is attenuated. Meanwhile, during a hold period, the switching circuit 31 disconnects the connection between the current-voltage converter circuit output voltage 54 and the first capacity C1, and connects the current-voltage converter circuit output voltage 54 and the second capacity C2. Furthermore, the transfer of the electric charge from the first capacity C1 to the second capacity C2 is carried out. Then, the comparator input voltage 51 is output through the buffer amplifier 32. The comparator input voltage 51 satisfies the relations of the formula (3).

[Formula 3]

$$\text{comparator input voltage 51} = \left(\text{electric charge of } C1 + \frac{\text{electric charge of } C2}{2}\right) \Big/ (C1+C2) \times \text{gain of buffer amplifier}$$

A formula (3)

Figure 5:
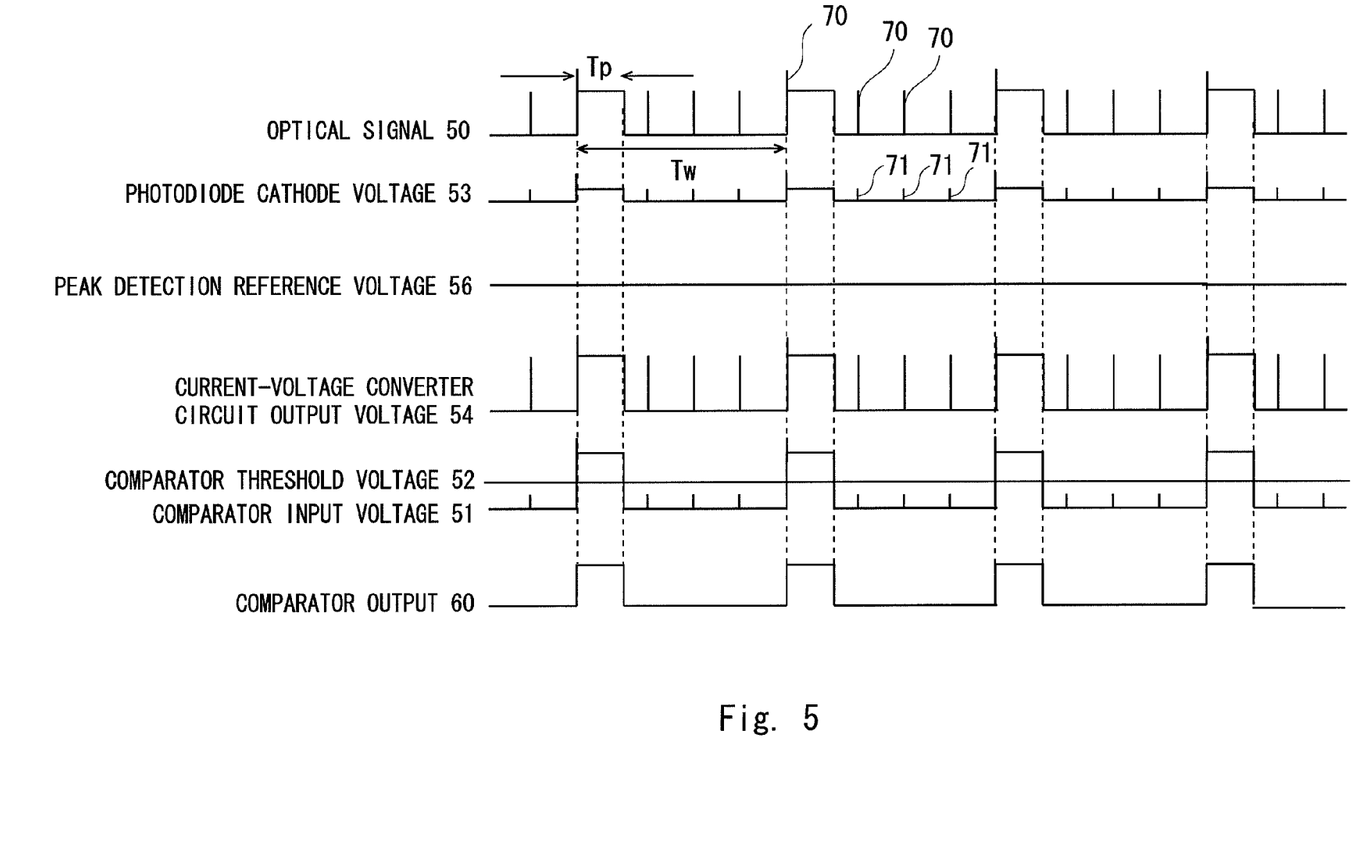
FIG. 5 is a signal wave form chart in the receivers according to the first exemplary embodiment of the present invention.

FIG. 5 is a signal waveform chart of a light receiving circuit 10 in the photocoupler isolation circuit 1 according to the first exemplary embodiment of the present invention. The operation of FIGS. 2-4 will be described using FIG. 5 as follows.

The optical signal 50, whose pulse period is Tw and pulse width is Tp, is transmitted through the LED 2B (see FIG. 1). Here, in the optical signal 50, edge noises are superimposed. Therefore, in the photodiode cathode voltage 53, slight edge noise 71 is produced. However, by making the photodiode cathode voltage 53 pass through the low-pass filter 22 whose cut-off frequency is sufficiently lower than the frequency component of the edge noise 71, the peak detection reference voltage 56 is obtained.

The optical signal 50 containing edge noise 70 are converted from the current signal into a voltage signal by the current-voltage converter circuit 12. The current-voltage converter circuit 12 outputs the current-voltage converter circuit output voltage 54. The current-voltage converter circuit output voltage 54 is input to the band limit circuit 30 to reduce the edge noise. The band limit circuit 30 outputs the comparator input voltage 51. The comparator input voltage 51 is input to the comparator 13.

Furthermore, the current-voltage converter circuit output voltage 54 is input to the peak detection circuit 23 that performs the peak detection in the comparator threshold circuit 20. The peak detection circuit 23 outputs the peak detection circuit output voltage 55 to apply the peak detection circuit output voltage 55 to the resistor R1. An intermediate voltage 57 is determined by the resistance ratio of the resistor R1 to the resistor R2 to which the peak detection reference voltage 56 is inputted. The intermediate voltage 57 generates the comparator threshold voltage 52 through the clamp circuit 24. The comparator threshold voltage 52 is input to the comparator 13 to obtain the comparator output 60.

Figure 6:
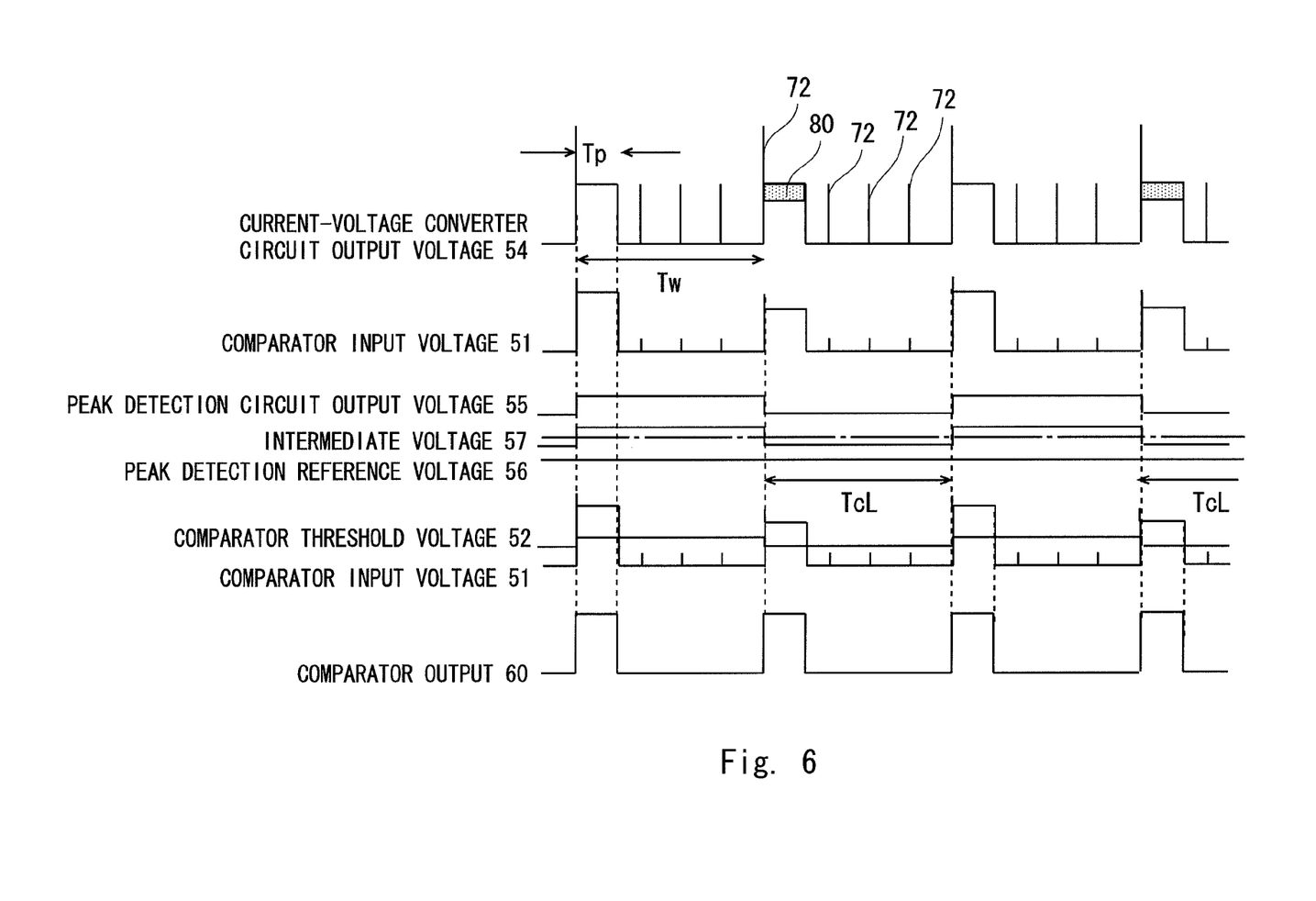
FIG. 6 is a wave form chart showing the lower limit movement of the clamp circuit according to the first exemplary embodiment of the present invention.

FIG. 6 is a waveform chart showing the lower-limit operation of clamp circuit 24 according to the first exemplary embodiment of the present invention. The optical signal 50 containing the edge noise 70 and noise components 80 are converted from the current signal into a voltage signal by the current-voltage converter circuit 12. Edge noise 72 of the current-voltage converter circuit output voltage 54 is reduced by going through the band limit circuit 30. The band limit circuit 30 outputs the comparator input voltage 51 as mentioned above, and the comparator input voltage 51 is input to the comparator 13. The current-voltage converter circuit output voltage 54 is input to the peak detection circuit 23 that performs peak detection. The peak detection circuit 23 provides the peak detection circuit output voltage 55 to the resistor R1.

The intermediate voltage 57 is determined by the resistance ratio between the resistor R1 and the resistor R2. Only during the TcL period (see FIG. 6), the intermediate voltage 57 generates the clamp circuit lower limit voltage as the comparator threshold voltage 52 through the clamp circuit 24. The comparator threshold voltage 52 is input to the comparator 13 and thereby makes the comparator 13 active to obtain the comparator output 60.

Figure 7:
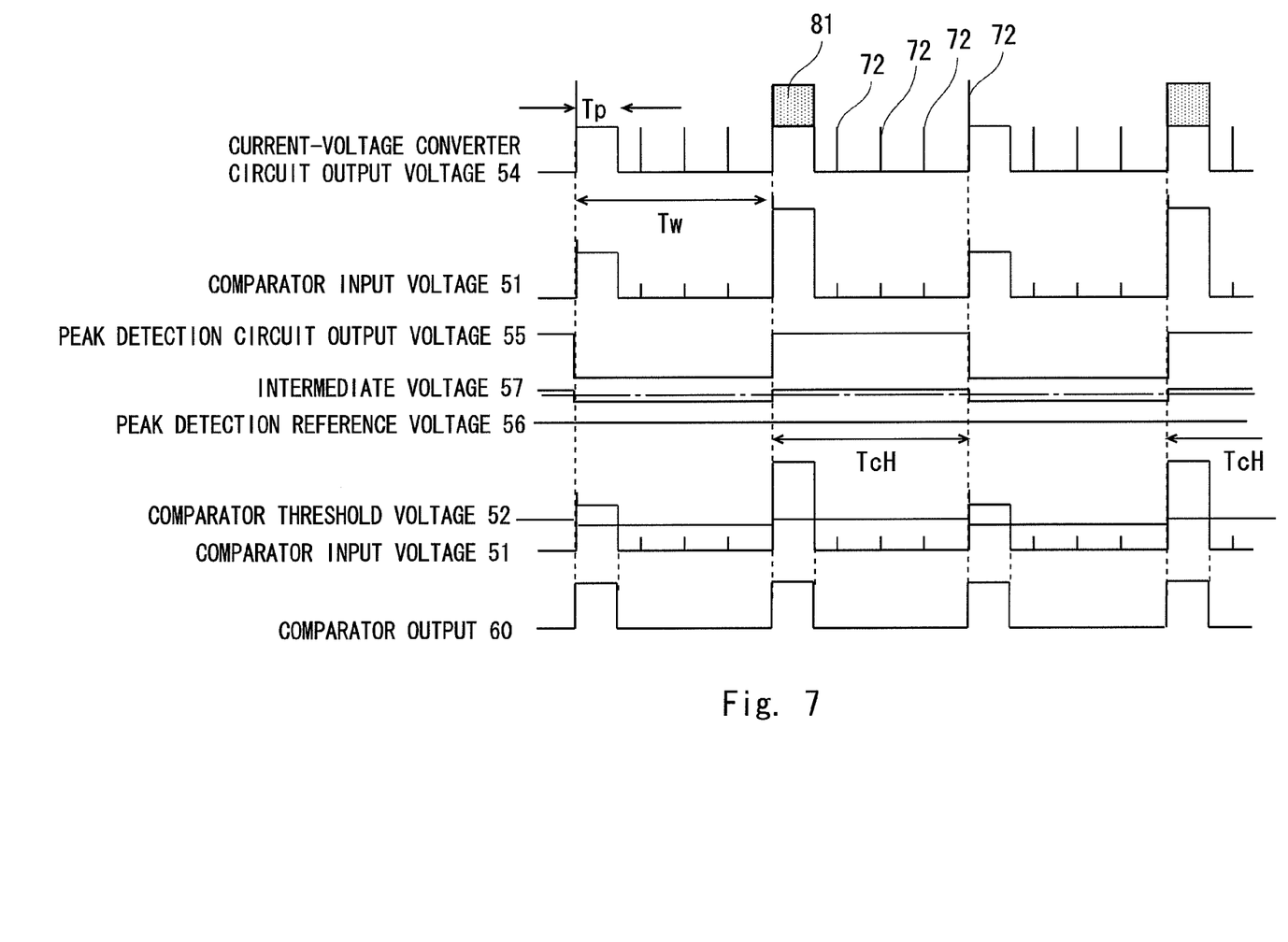
FIG. 7 is a wave form chart showing the upper limit movement of the clamp circuit according to the first exemplary embodiment of the present invention.

FIG. 7 is a waveform chart showing the clamp circuit upper-limit operation according to the first exemplary embodiment of the present invention. The optical signal 50 containing edge noise 70 and noise components 80 are converted from the current signal into a voltage signal by the current-voltage converter circuit 12. The current-voltage converter circuit 12 outputs the current-voltage converter circuit output voltage 54. The current-voltage converter circuit output voltage 54 is input to the band limit circuit 30 to reduce the edge noise. The band limit circuit 30 outputs the comparator input voltage 51. Furthermore, the current-voltage converter circuit output voltage 54 is input to the peak detection circuit 23. The peak detection circuit 23 outputs the peak detection circuit output voltage 55 to apply the peak detection circuit output voltage 55 to the resistor R1. The intermediate voltage 57 is determined by the resistance ratio between the resistor R1 and the resistor R2. Only during the TcH period (see FIG. 7), the intermediate voltage 57 generates the clamp circuit upper limit voltage as the comparator threshold voltage 52 through the clamp circuit 24. The comparator threshold voltage 52 is input to the comparator 13 and thereby makes the comparator active 13 to obtain the comparator output 60.

The mechanism to solve the problem will be described specifically with reference to FIGS. 6 and 7. In the case of the optical signal 50 containing the edge noise 70 (period 25 ns, pulse width 2 ns, amplitude 100 mVp) in addition to the pulsed signal (period (Tw) 100 ns, pulse width (Tp) 20 ns, amplitude 100 mVp), waveforms of the current-voltage converter circuit output voltage 54 as shown in FIG. 6 are obtained.

Operating frequency fo of the switching circuit 31 in which the band limit circuit 30 is disposed is determined by the following formulas (4) and (5).

[Formula 4]

$$N = Tw/Tp \qquad \text{A formula (4)}$$

[Formula 5]

$$fo \geq 1/Tw \times N \geq 1/(Tp \times 2) \qquad \text{A formula (5)}$$

Here, in the band limit circuit 30 which set operating frequency fo to 10 times of the pulse signal frequency, the edge noise of the comparator input voltage 51 decreases to 25 mV or lower. The intermediate voltage 57 varies by current-voltage converter circuit output voltage 54.
However, for only TcL period, the malfunction of the light receiving circuit caused by the noise decreases by setting the clamp circuit lower limit voltage, for example, to 30 mV.

Meanwhile, in the case of the optical signal 50 containing the edge noise components 81 (period 100 ns, amplitude 100 mVp that is equal to a pulsed signal) to the pulsed signal (period (Tw) 100 ns, pulse width (Tp) 20 ns, amplitude 100 mVp), waveforms of the current-voltage converter circuit output voltage 54 as shown in FIG. 7 are obtained.

Operating frequency fo of the switching circuit 31 in which the band limit circuit 30 is disposed is determined by the above-mentioned formulas (4) and (5).

Here, in the band limit circuit 30 which set operating frequency fo to 10 times of the pulse signal frequency, the edge noise of the comparator input voltage 51 decreases to 25 mV or lower. The intermediate voltage 57 varies by current-voltage converter circuit output voltage 54. However, for only TcH period, the malfunction of the light receiving circuit caused by the noise decreases by setting the clamp circuit upper limit voltage, for example, to 80 mV. Then, the reproduction of a pulse width required by high-speed digital modulation can be performed. Therefore, the light receiving circuit can receive normally.

According to the first exemplary embodiment, to prevent the malfunction of light receiving circuit 10 caused by the edge noise 70 or the noise components 80, 81 contained in the optical signal 50, the band limit circuit 30 is provided to reduce the frequency noise component higher than the frequency of the pulsed signal. In addition, to eliminate the noise components which cannot be removed in the band limit circuit 30, the light receiving circuit generates the threshold of the comparator by the peak detection circuit 23. Furthermore, the clamp circuit 24 to limit the threshold of comparator 13 within the binary range is provided. In other words, to eliminate the noise components which cannot be removed in the band limit circuit 30, peak detection is performed on the pulsed signal by the input-output voltage difference of the current-voltage converter circuit 12; the threshold of the comparator 13 is generated by dividing the output in any appropriate resistance ratio; and the clamp circuit 24 to limit the threshold of the comparator 13 within the binary range is provided.

According to the first exemplary embodiment, the light receiving circuit 10 does not include a differentiating circuit formed therein. As a result, the light receiving circuit 10 can reduce the optical malfunction caused by the noise, and a pulse width required by high-speed digital modulation can be reproduced. Therefore, the light receiving circuit 10 can receive normally. In other words, the malfunction caused by the noise of a signal can be reduced and reproduction of the pulse width of the high-speed digital modulation can be performed. Therefore, the light receiving circuit 10 can receive normally.

In the first exemplary embodiment, an example in which the transmitting chip 2A, the LED 2B and the receiver chip 3A, which constitutes the photocoupler isolation circuit, are housed in the one package 5 is explained. However, the present invention is not limited thereto, and various modifications can be made without departing from the scope of the present invention. For example, the transmitting chip 2A, the LED 2B and the receiver chip 3A may be housed in separate packages. Furthermore, the light receiving circuit in accordance with an exemplary aspect of the present invention is not limited to embodiments in which the light receiving circuit is mounted in the receiver chip of the photocoupler isolation circuit. That is, the light receiving circuit can be applied in various kinds of electronic parts within the range that does not deviate from the spirit of the present invention.

While the invention has been described with several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A light receiving circuit comprising:
a light receiving element that receives an optical signal and converts into electrical signal; a comparator that receives information about the optical signal through the light receiving element and generates a pulsed signal based on the received information;
a band limit circuit disposed between the light receiving element and the comparator, the band limit circuit removing noise components of frequency higher than the pulsed signal, and generating an input voltage to be input to the comparator; and
a comparator threshold circuit disposed between the light receiving element and the comparator, the comparator threshold circuit generating a threshold voltage to be input to the comparator, and controlling the threshold voltage to be input to the comparator within a binary range,
wherein the band limit circuit comprises:
a switch circuit that operates at a given clock frequency;
a first capacity that integrates an electric charge of the voltage input to the band limit circuit during a sampling period;
a second capacity to which the voltage input to the band limit circuit is connected and in which the transfer of the electric charge of the first capacity is performed during a hold period, the electric charge of the first capacity being separated from the voltage input to the band limit circuit; and
amplification means connected to the second capacity, the amplification means outputting the voltage input to the comparator.

2. The light receiving circuit according to claim 1, wherein the light receiving element is a photodiode.

3. The light receiving circuit according to claim 2, wherein a current-voltage converter circuit is disposed between the light receiving element and the band limit circuit.

4. The light receiving circuit according to claim 3, wherein the comparator limit circuit comprises:
amplification means that amplifies an electrical signal output from the light receiving element;
a low-pass filter that receives the output of the amplification-means and removes the noise components which are higher in frequency than the pulsed signal;
a peak detection circuit that performs peak detection of the voltage output from the current-voltage converter circuit;
a resistance provided to generate the intermediate voltage from the voltage output from the peak detection circuit and the voltage output from the low-pass filter;
a clamp circuit that limits the threshold input to the comparator within the binary range.

5. A photocoupler isolation circuit comprising:
an input side chip including a light emitting element that converts a pulse width modulated signal into an optical pulse signal and transmits the converted optical pulse signal; and
a receiving chip including a light receiving circuit that receives the optical pulse signal,
wherein the photocoupler isolation circuit comprises, as the light receiving circuit, a light receiving circuit as claimed in claim 2.

6. The light receiving circuit according to claim 1, wherein a current-voltage converter circuit is disposed between the light receiving element and the band limit circuit.

7. The light receiving circuit according to claim 6, wherein the comparator limit circuit comprises:
amplification means that amplifies an electrical signal output from the light receiving element;
a low-pass filter that receives the output of the amplification-means and removes the noise components which are higher in frequency than the pulsed signal;
a peak detection circuit that performs peak detection of the voltage output from the current-voltage converter circuit;
a resistance provided to generate the intermediate voltage from the voltage output from the peak detection circuit and the voltage output from the low-pass filter;
a clamp circuit that limits the threshold input to the comparator within the binary range.

8. A photocoupler isolation circuit comprising:
an input side chip including a light emitting element that converts a pulse width modulated signal into an optical pulse signal and transmits the converted optical pulse signal ; and
a receiving chip including a light receiving circuit that receives the optical pulse signal,
wherein the photocoupler isolation circuit comprises, as the light receiving circuit, a light receiving circuit as claimed in claim 1.

* * * * *